United States Patent
Pong et al.

(10) Patent No.: US 9,304,944 B2
(45) Date of Patent: Apr. 5, 2016

(54) SECURE MEMORY ACCESS CONTROLLER

(75) Inventors: Fong Pong, Mountain View, CA (US); Eric Spada, Groton, MA (US); Karen Schramm, Needham, MA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/434,556

(22) Filed: Mar. 29, 2012

(65) Prior Publication Data

US 2013/0262880 A1 Oct. 3, 2013

(51) Int. Cl.
*G06F 12/14* (2006.01)
*G06F 21/72* (2013.01)
*G06F 21/79* (2013.01)

(52) U.S. Cl.
CPC ........ *G06F 12/1441* (2013.01); *G06F 12/1408* (2013.01); *G06F 21/72* (2013.01); *G06F 21/79* (2013.01); *G06F 2211/007* (2013.01)

(58) Field of Classification Search
CPC . G06F 12/1441; G06F 12/1408; G06F 21/72; G06F 21/79; G06F 2211/007
See application file for complete search history.

(56) References Cited

U.S. PATENT DOCUMENTS

| | | | | |
|---|---|---|---|---|
| 5,646,997 A * | 7/1997 | Barton | ........................... | 713/176 |
| 7,412,579 B2 * | 8/2008 | O'Connor et al. | ............. | 711/163 |
| 8,170,205 B2 * | 5/2012 | Takeda | ............................ | 380/37 |
| 8,181,042 B2 * | 5/2012 | Hobson | .......................... | 713/300 |
| 8,261,159 B1 * | 9/2012 | Sommer et al. | ................ | 714/768 |
| 8,363,834 B1 * | 1/2013 | Singhal | ............................ | 380/46 |
| 2006/0282712 A1 * | 12/2006 | Argon et al. | .................... | 714/701 |
| 2010/0058070 A1 * | 3/2010 | Garay et al. | ................... | 713/190 |
| 2010/0153699 A1 * | 6/2010 | Falconer et al. | .................... | 713/2 |
| 2010/0211801 A1 * | 8/2010 | Kim et al. | ....................... | 713/189 |
| 2010/0332775 A1 * | 12/2010 | Kapil et al. | .................... | 711/157 |
| 2011/0191562 A1 * | 8/2011 | Chou et al. | ..................... | 711/163 |
| 2012/0144277 A1 * | 6/2012 | Lee et al. | ........................ | 714/807 |
| 2012/0233383 A1 * | 9/2012 | Toda | ...................... | H03M 13/13 711/103 |

* cited by examiner

*Primary Examiner* — Nadia Khoshnoodi
*Assistant Examiner* — Thomas Ho
(74) *Attorney, Agent, or Firm* — Brinks Gilson & Lione

(57) ABSTRACT

A memory access circuit and a corresponding method are provided. The memory access circuit includes a crypto block in communication with a memory that encrypts data of a data block on a block basis. The memory access circuit also includes a fault injection block configured to inject faults to the data in the data block. The memory access circuit further includes a data scrambler and an address scrambler. The data scrambler is configured to scramble data in the memory by shuffling data bits within the data block in a plurality of rounds and mash the shuffled data bits with random data. The address scrambler is configured to distribute the scrambled data across the memory. A memory system including the memory access circuit is also disclosed to implement the corresponding method.

20 Claims, 9 Drawing Sheets

US 9,304,944 B2

SECURE MEMORY ACCESS CONTROLLER

1. TECHNICAL FIELD

This disclosure relates generally to memory controllers. More particularly, it relates to secure memory access unit that protects and secures data stored in memory.

2. BACKGROUND

Data may be stored in different kinds of memories such as Static Random Access Memory (SRAM), Random Access Memory (RAM), and Dynamic random-access memory (DRAM). The stored data may be at risk from potential attack. For example, in a System-on-a-chip (SOC) unit, or other embedded systems, the memory external to SOC may be attacked by potential hackers. At the same time, more and more data is stored in DRAM external to SOC controllers, especially for markets such as Point-of-Sale (POS), automatic teller machine (ATM), banking and self-automated payment systems. As smartphones and mobile payments systems gains traction, the data stored in mobile devices also becomes hacking targets.

BRIEF DESCRIPTION OF THE DRAWINGS

The system may be better understood with reference to the following drawings and description. In the figures, like reference numerals designate corresponding parts throughout the different views.

DETAILED DESCRIPTION

The description below relates to a memory access circuit and corresponding method and system. A secured memory protects stored data in different systems and applications. The memory access circuit can include a crypto block in communication with a memory that encrypts data on a block basis. The memory access circuit can include a fault injection block configured to inject faults to the memory. The memory access circuit can further include a data scrambler configured to scramble data in the memory by shuffling data bits within a data block in a plurality of rounds and mash the shuffled data bits with random data.

Figure 1:
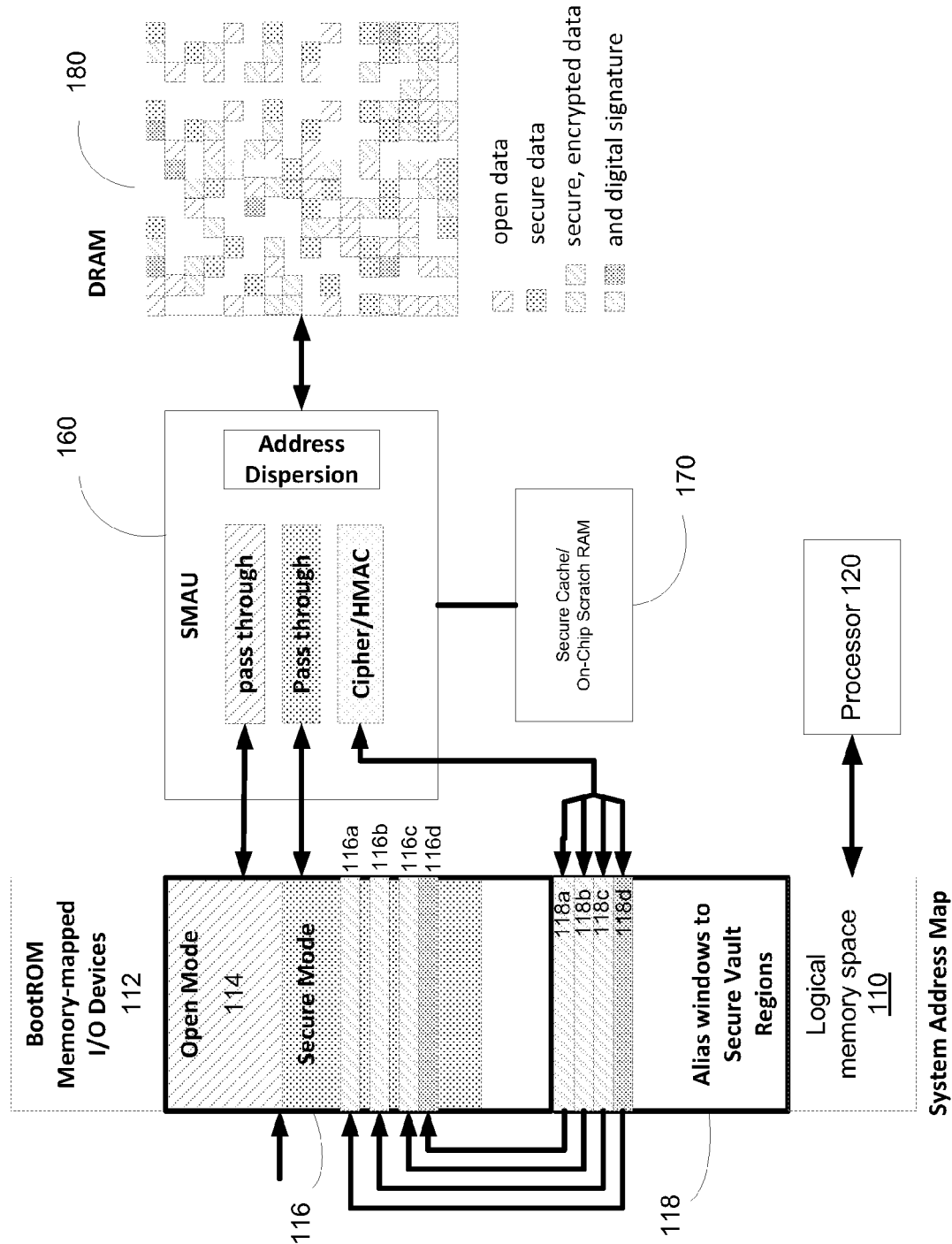
FIG. 1 is a block diagram an exemplary memory access circuit and distributed mapping of data to memory.

FIG. 1 is a block diagram of an exemplary memory access circuit and distributed mapping of data to a memory. In one embodiment, the memory access circuit is a SMAU 160 that can reside or sit between a logical memory and a physical memory. The logical memory may be a system address map 110 and the physical memory may be an external DRAM memory 180. The SMAU 160 protects secure data stored in the external DRAM memory 180 by a number of techniques.

The memory space in the logical memory space 110 may be programmed to include two regions, designated as a non-secure region 114 and a secure region 116. The SMAU 160 accepts both secure and non-secure accesses while distinguishing between secure and non-secure accesses accordingly. The SMAU 160 allows secure accesses to the secure region 116 and rejects non-secure accesses to the secure region 116.

A plurality of memory windows may be declared to the SMAU 160 as secure vault windows. In this illustration, four secure vault windows 116a, 116b, 116c, and 116d are disclosed. However, it is possible to declare more secure vault windows if necessary based on the particular application requirement. Data in these secure vault windows are encrypted and digitally signed by the SMAU 160 before they are stored in the DRAM. The SMAU 160 decrypts and authenticates data in the secure vaults when they are read by the processor 120.

Additionally or alternatively, accesses to secure vaults may be further routed via plain text windows 118a, 118b, 118c, and 118d, in FIG. 1. The plain text windows 118a, 118b, 118c, and 118d are aliases to the secure vaults of cipher texts in the secure vault windows 116a, 116b, 116c, and 116d. Thus, direct accesses to cipher text in the secure vault windows 116a, 116b, 116c, and 116d can be optionally blocked.

Cipher text windows can be declared in the secure memory region 116. However, the cipher text windows can also be assigned within the non-secure region 114. The exemplified design is flexible enough to allow cipher text windows to be anywhere if necessary.

Accordingly, there are different types of data stored in the physical DRAM memory 180 as illustrated in FIG. 1. For example, there are may be four types of data including: plain data in non-secure area, plain data in secure area, encrypted secure-vault data, and encrypted secure-vault data with digital signatures. The secure vault data is digitally signed if digital signing is turned on.

The SMAU 160 further includes a data distribution module configured to scatter and distribute the four types of data to the physical memory on a block basis.

For example, each block may include 32-byte data. The spatial dispersion of the different types of data increases the degree of complexity for potential attacks by making static analysis of secure data difficult. The data dispersion can be achieved by an effective address-scrambling method that maps logic memory addresses (viewed by the programmers) to physical memory space in a random manner. More details about the address-scrambling will be disclosed later.

Thus, secure and non-secure mode software can execute under partitioned address space in the logical memory while the secure and non-secure data are randomly intermixed in the physical memory locations. Additionally, secure vault data may be additionally scrambled with purposely injected faults, which are recovered at read time. The SMAU 160 adopts all the above techniques so that the SMAU 160 writes a stream of data to the physical memory in arbitrary order. Thus, the SMAN 160 prevents attackers from establishing correlations between secure data in the logical memory and their physical memory locations by observing time-resolved memory traces.

In FIG. 1, the SMAU 160 can also handle accesses to an on-chip SRAM block 170. The size of the on-chip SRAM block may vary based on applications. For example, the on-chip SRAM block 170 may have a 256 KB size. Similar to the external DRAM memory 180, the on-chip SRAM block 170 can be partitioned to regions to store secure and non-secure data as well.

Figure 2:
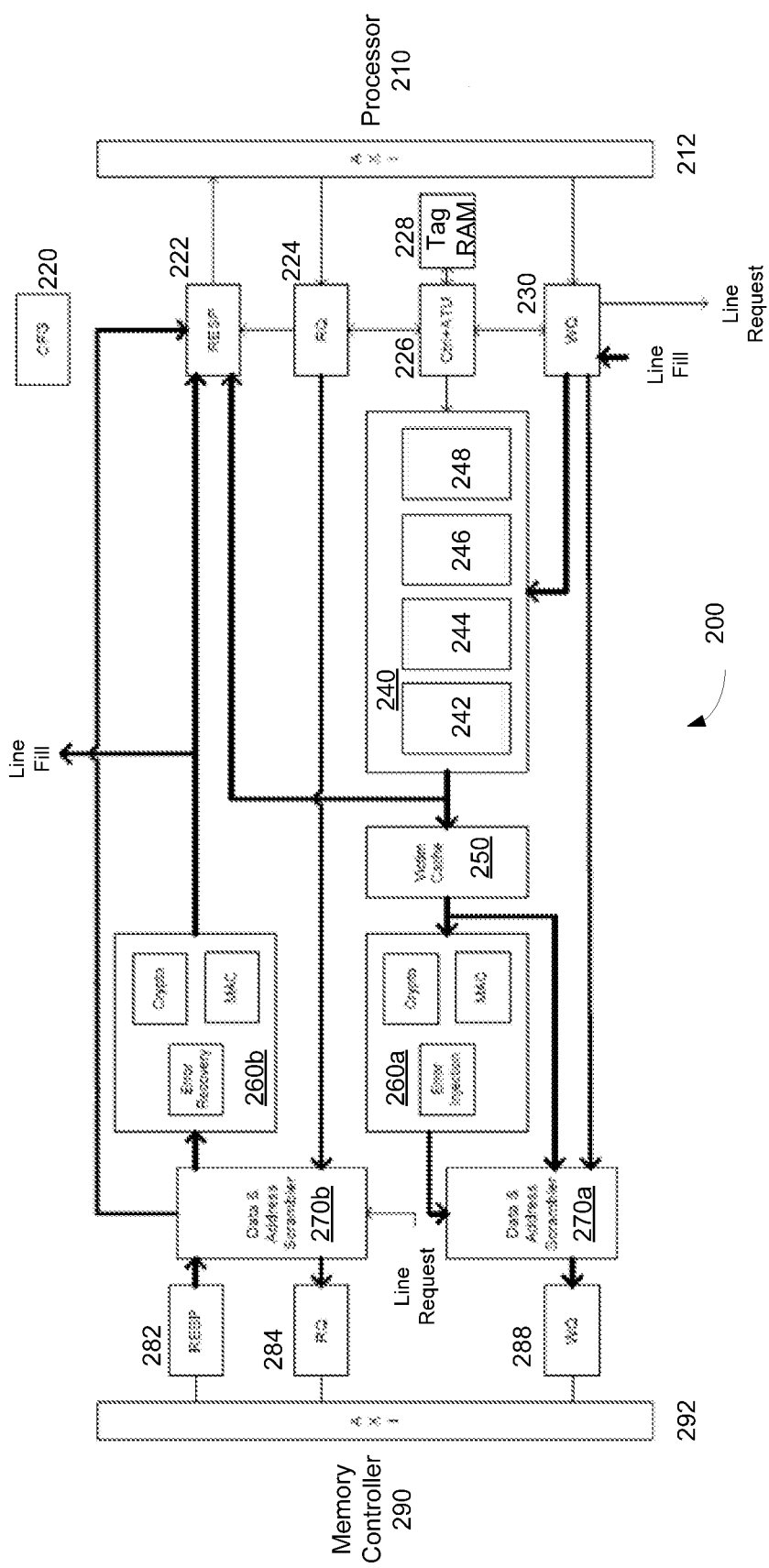
FIG. 2 is a block diagram of an exemplary hardware architecture of a secure memory access unit (SMAU).

FIG. 2 is a block diagram of an exemplary hardware architecture of the SMAU 200. The SMAU 200 can reside between a processor 210 and a memory controller 290. The SMAU 200 can communicate with the processor 210 through an advanced extensible interface (AXI) 212 and communicates with the memory controller 290 through an AXI 292. The SMAU 200 includes a configuration block CFG 220 that includes control, status and statistics registers.

The SMAU 200 includes a controller unit 226 having a RAM controller and an Address Translation Unit (ATU). The controller unit 226 is configured to: classify accesses to non-secure area, secure area, or secure vaults; reject and log request with violations; handle accesses to the on-chip SRAM 240; and manage a separate cache for DRAM data (open and secure data indiscriminately). The ATU is configured to map plain text windows to cipher text windows in FIG. 1.

The SMAU 200 includes an on-chip SRAM and DRAM cache 240. In one embodiment, the on-chip SRAM and DRAM cache 240 may be a 256 KB byte-addressable on-chip SRAM and 32 KB byte-addressable DRAM cache. The on-chip SRAM and DRAM cache 240 includes a plurality of cache blocks 242, 244, 246, and 248. The cache blocks may have 18432*32 byte. The on-chip SRAM and DRAM cache 240 may be a low-power RAM with 2-cycle access time and 8-row blocks that can be independently powered down with a 0.3 um$^2$, 25 uW/MHz dynamic power, and 1270 uW leakage power. In one example, the DRAM cache is 2-way set-associative with 32 B cache lines.

The SMAU 200 further includes a victim cache 250. For example, the victim cache 250 may be an 8-entry victim cache; each entry is of 32 B.

The SMAU further includes a crypto block 260a between the victim cache 250 and the scrambler block 270a. The crypto block 260a includes a crypto that works on-the-fly, an error injection block, and a memory authentication code (MAC) block. The crypto block 260a is configured to encrypt data to the secure vault, calculate digital signatures, and Inject faults. The MAC block is configured to implement a set of cryptographic hash functions such as SHA256 to effectively generate memory authentication code.

The scrambler blocks 270a includes a data scrambler and an address scrambler to further manipulate the data and address. For example, the data scrambler in the scrambler blocks 270a shuffles and mashes data with random values to form elusive articles. Similarly, on data return path (from memory to system), the data scrambler blocks 270b includes a data scrambler that implements an inverse function that de-scrambles data back to its original form.

The address scrambler in the scrambler blocks 270a is configured to distribute the scrambled data across DRAM locations. For example, the scrambled data in a data block may be distributed to any physical memory address of the DRAM. The address scrambler in the scrambler blocks 270b is configured to recollect the scrambled data across DRAM locations back to its original form.

The crypto block 260b implements a reverse function to remove the injected error by the crypto block 260a and decrypts the encrypted data. The crypto block, the MAC block and the error injection block in the crypto block 260a may be arranged in different orders as long as the crypto block 260b has the same arrangement as the in the crypto block 260b.

Figure 3:
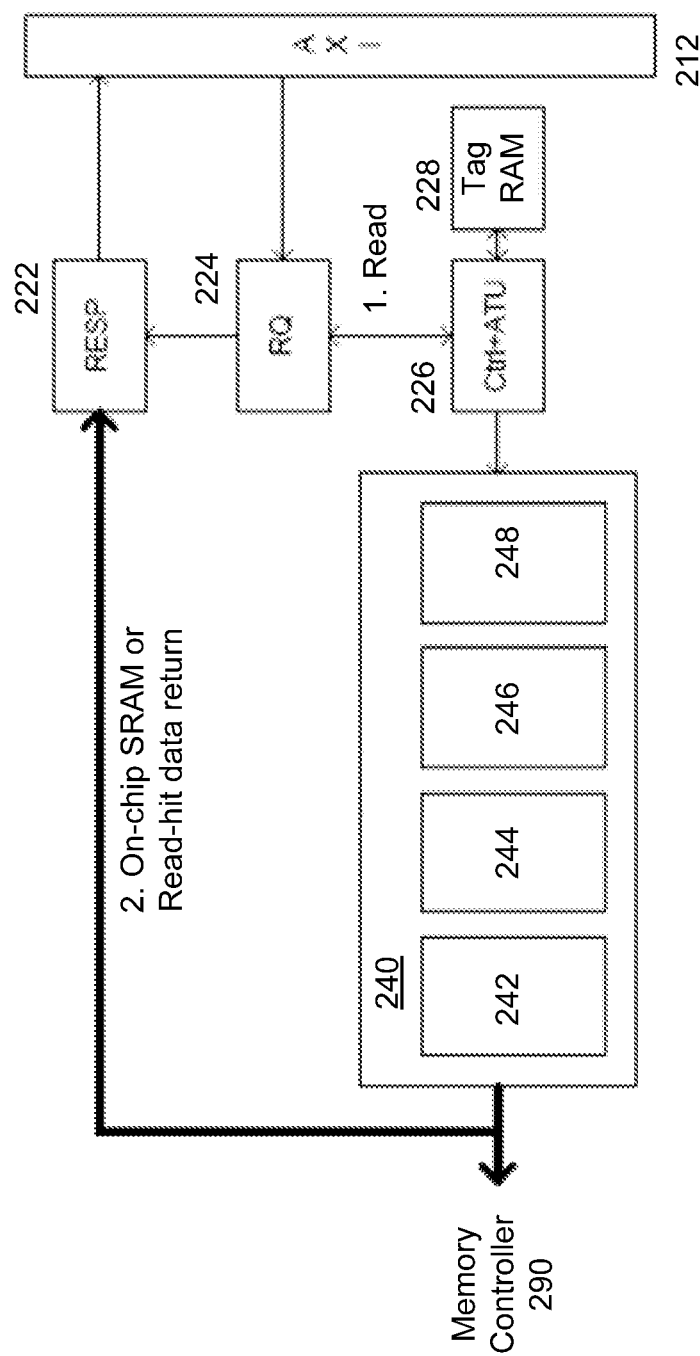
FIG. 3 is a block diagram of an exemplary read hit scenario of the SMAU.

FIG. 3 is a block diagram of an exemplary read hit scenario of the SMAU's operations for reads to on-chip SRAM cache 240. The controller unit 226 first receives a read request from the read queue (RQ) 224. Then the controller unit 226 checks the on-chip SRAM cache 240 to determine if the data is available in the on-chip SRAM cache 240 or not. If the data is available in the on-chip SRAM cache 240, the data is returned to the response (RESP) 222. This may also be referred as a read-hit to the on-chip RAM cache 240. Distinction between accesses to on-chip SRAM and DRAM may be made by their designated address spaces.

Figure 4:
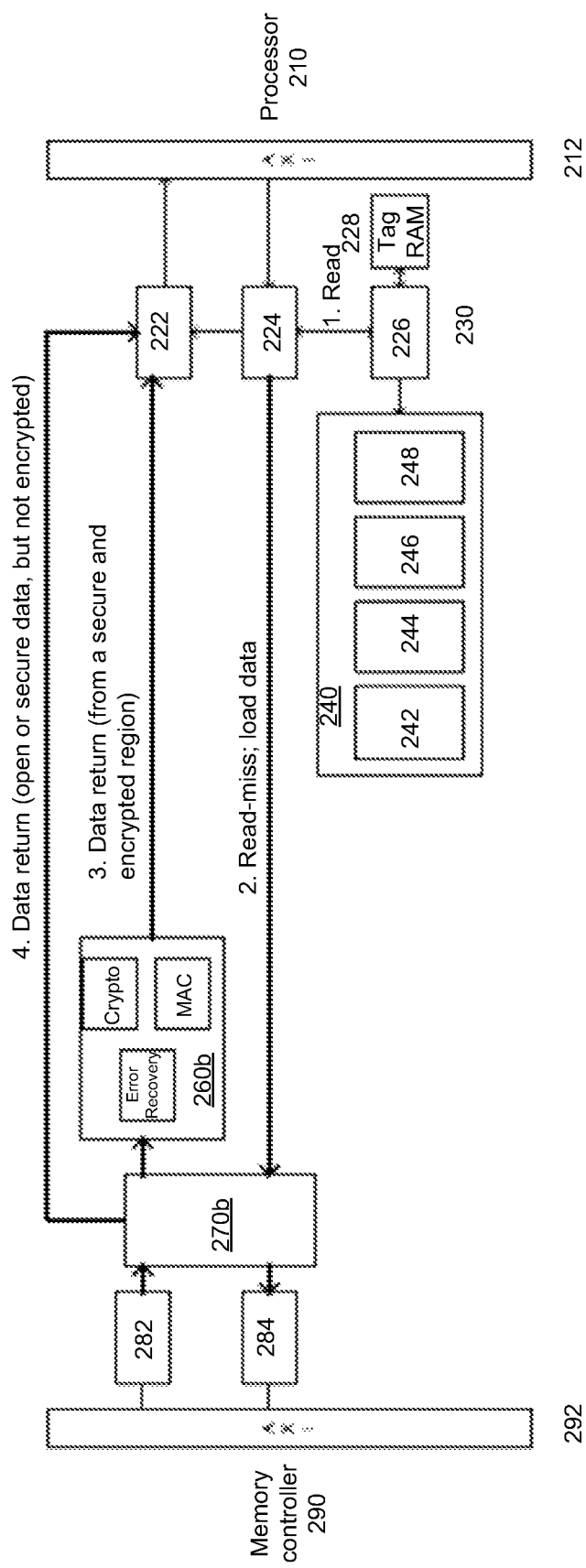
FIG. 4 is a block diagram of an exemplary read miss scenario the SMAU's operations for read misses to on-chip SRAM cache.

FIG. 4 is a block diagram of an exemplary read miss scenario SMAU's operations for read misses to on-chip SRAM cache 240. Upon a miss to the on-chip SRAM cache 240, a read request is launched to the memory controller 290. The data and address scrambler 270b ensures that the mapping from the logic address space to the physical DRAM locations is done properly. When data is returned by the memory controller 290, the data and address scrambler 270b applies its inverse function to recover the data to proper form.

Subsequently, there are two cases depending on whether the data is in the secure vault. If the data is in the secure vault according to the designated address, the data is processed by the crypto block 260b, i.e. the data is recovered from faults that were purposely injected on creation (data writes), followed by decryption and authentication (if turned on). If the authentication fails, the error is logged and poison data is returned so that a potential attacker could not read the desired data in the secure vault. If the data is not in the secure vault, the plain data is returned directly to RESP 222.

Figure 5:
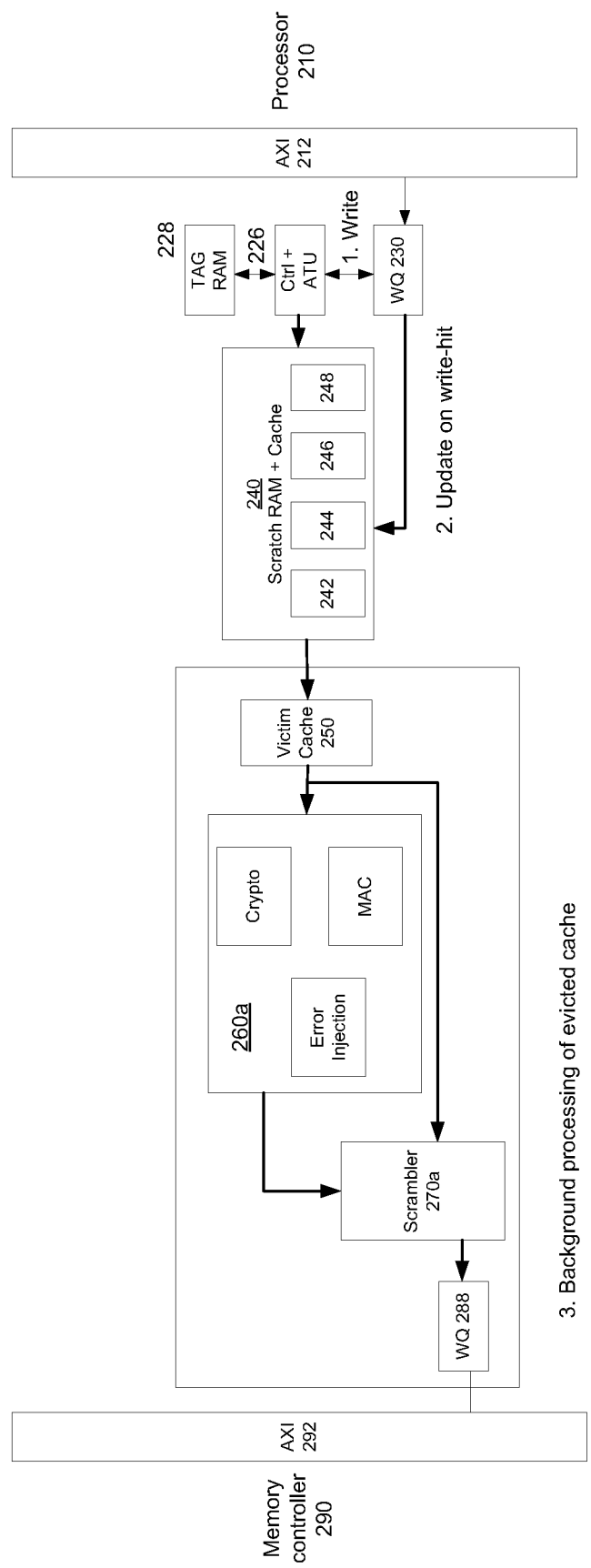
FIG. 5 is a block diagram of the SMAU's exemplary operations for writes.

FIG. 5 is a block diagram of an exemplary SMAU's operations for writes. There are four scenarios: writes to on-chip SRAM 240, cache write-hits to DRAM locations, cache write-miss to DRAM locations with free cache entry, and cache write-miss to DRAM locations without free cache entry. For writes to on-chip SRAM 240, they are handled locally as regular memory writes. For write-hits to DRAM locations, write hits to DRAM cache are performed locally within SMAU.

For write-miss to DRAM locations with free cache entry, write misses are handled such that—If the write granularity is N-byte (or a full cache line size, said 32 bytes in this example), a free entry in the DRAM cache is allocated. The writes are performed to the DRAM cache. There is no read-modify-write cycle incurred for N-byte writes. This is due to that DRAM data scrambling is on N-byte granularity. As a result, N-byte writes represent effective overwriting cases. It is thus encouraged to use N-byte data accesses. N may be 32 or any other predetermined integer number.

When a free cache entry does not exist, an existing cache line is evicted to the external DRAM memory to make room for the new data. The evicted line is first pushed into the victim cache 250. Data lines in the victim cache 250 are drained back to DRAM through the memory controller 290. The data lines can be drained in the background, independently to other operations. In FIG. 5, data lines fall in secure vault areas go through the crypto block 260a. In other words, the evicted data are within one of the programmed plain text windows. If the evicted data line is not for secure vault, the cryptography process in the crypto block 260a is bypassed.

The data and address scrambler 270a performs its data and address maneuver functions before data is pushed to the memory controller 290 through the write queue (WQ) 288 and the AXI 292. When the MAC block is turned on, two writes will be launched: one is for the data, and the other is for the message authentication code.

Figure 6:
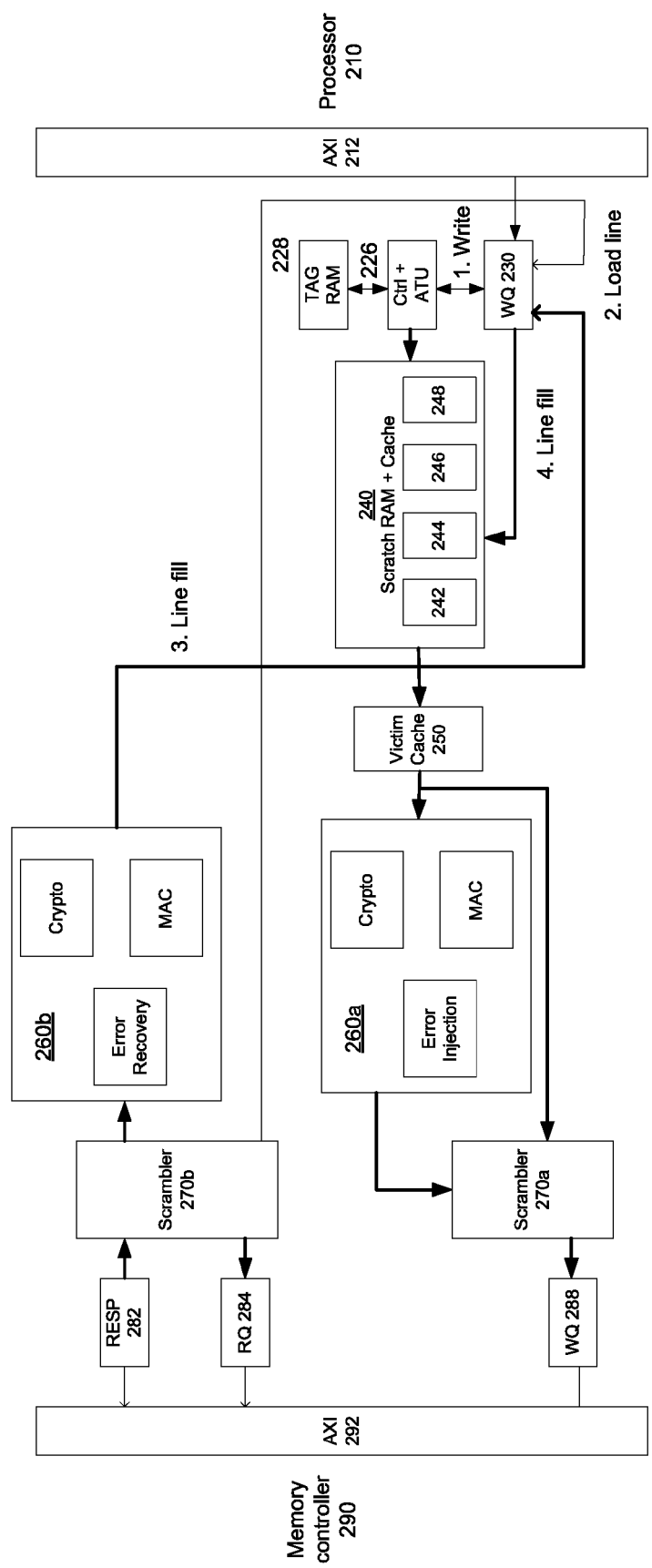
FIG. 6 is a block diagram of an exemplary Byte-Write Misses to DRAM Cache.

FIG. 6 is a block diagram of exemplary Byte-Write Misses to DRAM Cache, which may be referred as Word-Write Misses to DRAM Cache. Complex cases of Byte-Write Misses or Word-Write Misses can occur under partial-line updates to secure vault data.

On a miss, a read-modify-write cycle can occur. The memory controller 290 can load the missed (secure vault) data line from DDR RAM through data interfaces. The scrambler 270b can descramble loaded data. The descrambled data is decrypted and authenticated by the crypto block 260b. The decrypted and authenticated data line is merged with the partial data writes and the final plain text line is stored in the DRAM cache.

The operation may cause a cache line to be replaced, e.g., due to lack of a free entry for the target line loaded. The evicted cache line is pushed to the victim cache 250, and is written back to DRAM. The cache line can be written back in background, independently to other operations. If the evicted data line is within one of the programmed plain text windows, the crypto block 260a encrypts the evicted data line and calculates a digital signature. The memory controller 290 writes the encrypted data and associated signature to the DRAM or other external memories.

If the partial updates are not to secure vault data, they are sent to the memory controller 290 directly under cache misses. It does not incur the same read-modify-write cycle described above.

To protect secure vault data, the crypto blocks 260a and 260b may use Advanced Encryption Standard (AES) cipher. The AES cipher may operate on 128 b (16 B) data blocks. The key length is either 128 b, 192 b or 256 b, which is independently and randomly selected by the SMAU hardware on a per data block basis. For example, the block size may be 32-byte. A 32-byte data block incurs two independent 16-byte cipher operations.

Digital signatures (Secure Hash) are calculated upon encrypted data. On data return path from the memory controller 290 to the processor 210 during processor reads, the MAC in the crypto block 260a can be computed in parallel with data decryption operation. This design speeds up the data return path, which can improve system performance.

For example, SHA-256 may be deployed in one embodiment. Inputs to SHA-256 is a 512 b block, which can include the 32 B data block, secret data picked by SMAU and padding bytes. Output of the SHA-256 is a 256 b signature. The SHA256 operation, due to its heavy operations, may become a performance bottleneck, especially on the data return path. As a result, Cygnus is configured to allow SMAU authentication turned on and off by the users or developers. SHA-256/128, which is a truncated version of SHA-256 selects the leftmost 128 b, may be used as well. The SHA-256/128 leaves 128 b for additional cipher methods.

For secure vault data, the error injection block in the crypto block 260a may be enabled to inject faults to the final encrypted data and Hash-based Message Authentication Code (HMAC) signature before they are stored to the external memory.

First, a small and finite number of hash functions $H_{err}$, are defined. Second, the hash functions take inputs the data block address and output the bits to be flipped.

The final data output is CipherText $\hat{H}^0_{err}$ (Address) $\hat{}$ ... $\hat{H}^k_{err}$ (Address). When the purposely corrupted data is fetched back from the DRAM, the error injection block in the crypto block 260b remove the injected errors by the same procedure before the data is decrypted and authenticated.

Figure 7:
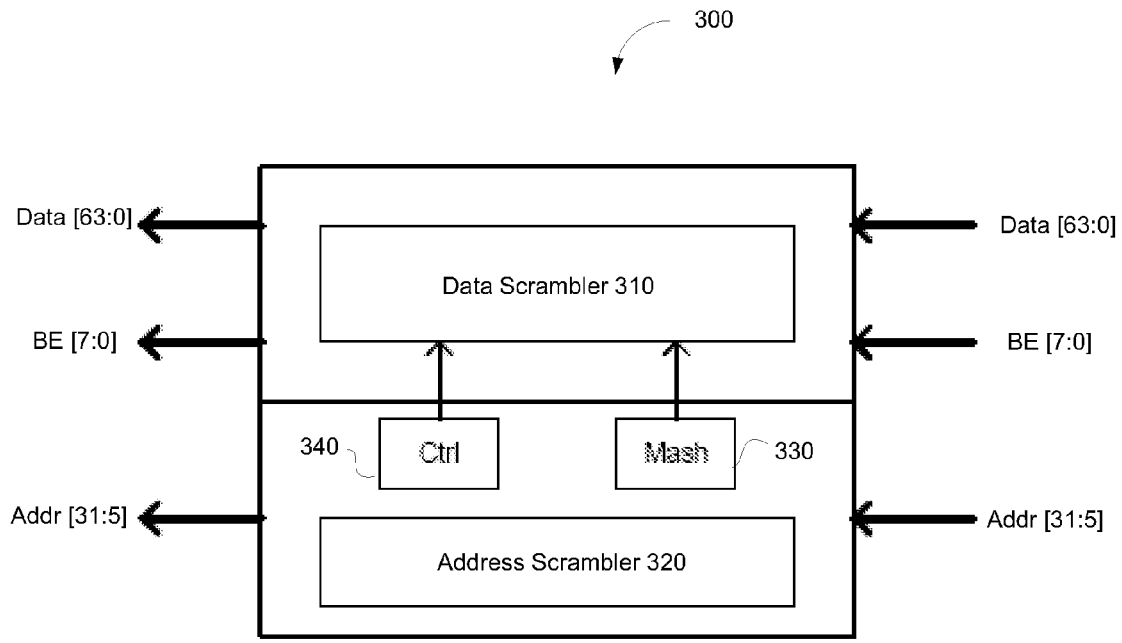
FIG. 7 is a block diagram of an exemplary architecture model of the scrambler.

The scrambler is configured to maneuver data and address to create further randomness. FIG. 7 is a block diagram of an exemplary architecture model of the scrambler 300. Inputs to the scrambler 300 include 64 b input data Data[63:0], 8 b data enables BE[7:0], and a memory line address Addr[31:5]. The data scrambler 310 is controlled by the address scrambler 320, which calculates a set of mash values 330 and control signals 340. The mash values 330 are mangled with the input data Data[63:0] and the control signals 340 causes shuffling of data.

The data scrambler 310 is configured such that a symmetric inverse function can restore the shuffled data back to its original form. This also allows recovery of scrambled data on data return path from the memory.

Address scrambling is a process that maps the logical memory address space from the programmers' view to physical memory locations in a random and unpredictable manner.

In one embodiment of the SMAU, the following approach is taken. A general DRAM device configuration is assumed that the device may contain 8 internal banks, each with 8192 b memory page. In other words, internal banks may keep a 8192 b or 1 KB memory page open for optimized RAM performance. Next, a memory row "block" of 8×8192 b (or 8 KB) may be logically defined across the 8 internal banks. Subsequently, the example design treats a 32 b address in the following manner:

addr[4:0]—Byte address, which is not used in the address scrambling logic.

addr[9:5]—32 B line address within an (open) 8192 b memory page.

addr[12:10]—bank address.

addr[s−1:13]—the "memory block" address within a memory segment of 2(s−13)*8 KB.

addr[31:s]—the base address of a defined memory segment.

Once the 32 b address is defined, the following method is implemented in the scrambler 300.

The total DRAM space of M bytes is divided into m regions or segments. Memory segments do not need to be of the same size. By a general description, a memory segment of 2 s bytes is considered to contains 2 d×8 KB, where d=(s−13).

For an address A[31:0] that falls within the interested segment above, location of the 32 B datum within a 8192 b memory page is calculated by treating the line address addr[9:5] as a polynomial LA(X). A degree-5 generator polynomial G0(X) is used by SMAU to produce:

$$\text{LineAddr} = F([LA(X)xj + \text{Rnd0}(X)]) \bmod G0(X)$$

This permutation operation causes 32×32 B consecutive datum, in the sense of 32 linear 32 B datum as perceived by software in the address space, to be distributed within an 8192 b memory page.

After the above operation, the block addr[s−1:13] is similarly considered as a polynomial BA(X), a (s−13)-degree generator polynomial G1(X) is selected by SMAU such that:

$$\text{BlkAddr}(X) = F([BA(X)Xn + \text{Rnd}(X)]) \bmod G1(X) - (1)$$

BlkAddr(X) will be address within the target segment for the 8 KB block.

The configurable parameters (in fact hidden from the users) include:
The general function F that alters the polynomial inputs.
The multiplier exponent n of the Xn term applied to the address polynomial Addr(X).
The random constant Rnd(X) that is randomly picked by the SMAU at a power-on initialization.
The generator polynomial G(X).

Figure 8:
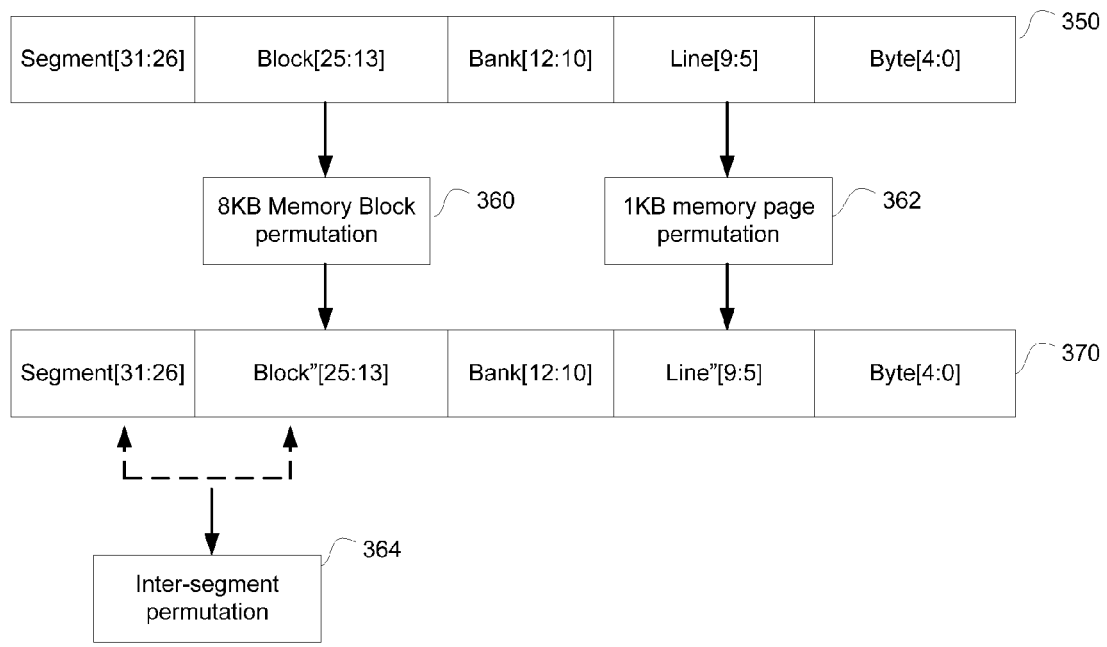
FIG. 8 is a block diagram that demonstrates exemplary permutation operations of the scrambler of FIG. 7.

FIG. 8 is a block diagram that demonstrates exemplary permutation operations of the scrambler 300 of FIG. 7. For a 64 MB segment, starting with the (logic) linear address perceived by the software, the line and block addresses within the memory page and the memory segment of address 350 are computed. The permutation operations include 8 KB Memory Block permutation 360 and 1 KB memory page permutation 362. The 8 KB Memory Block permutation 360 permutes memory block addresses of Block[25:13] to Block"[25:13]. The 1 KB memory page permutation 362 permutes line address of Line[9:5] to Line"[9:5]. The result address 370 shows where the 32 B line will reside within the 64 MB segment, and the locations within the memory page of an active internal memory bank.

In the diagram, a similar logic may be applied to mix data blocks among segments by inter-segment permutation 364.

To create further deception to the potential attackers, all data of all types stored in the memory may be scrambled. The data scrambler deploys simpler bit-manipulation schemes than cryptographic methods. The data scrambler is deployed for both processor-to-memory (for memory writes) and memory-to-processor (for memory reads) paths. In one embodiment of the scrambler, the scrambler handles 64-bit data per cycle. The core of the data scrambler is a data shuffle network that shuffles the input data with random mash data. There are many ways to design the data shuffle network.

Figure 9:
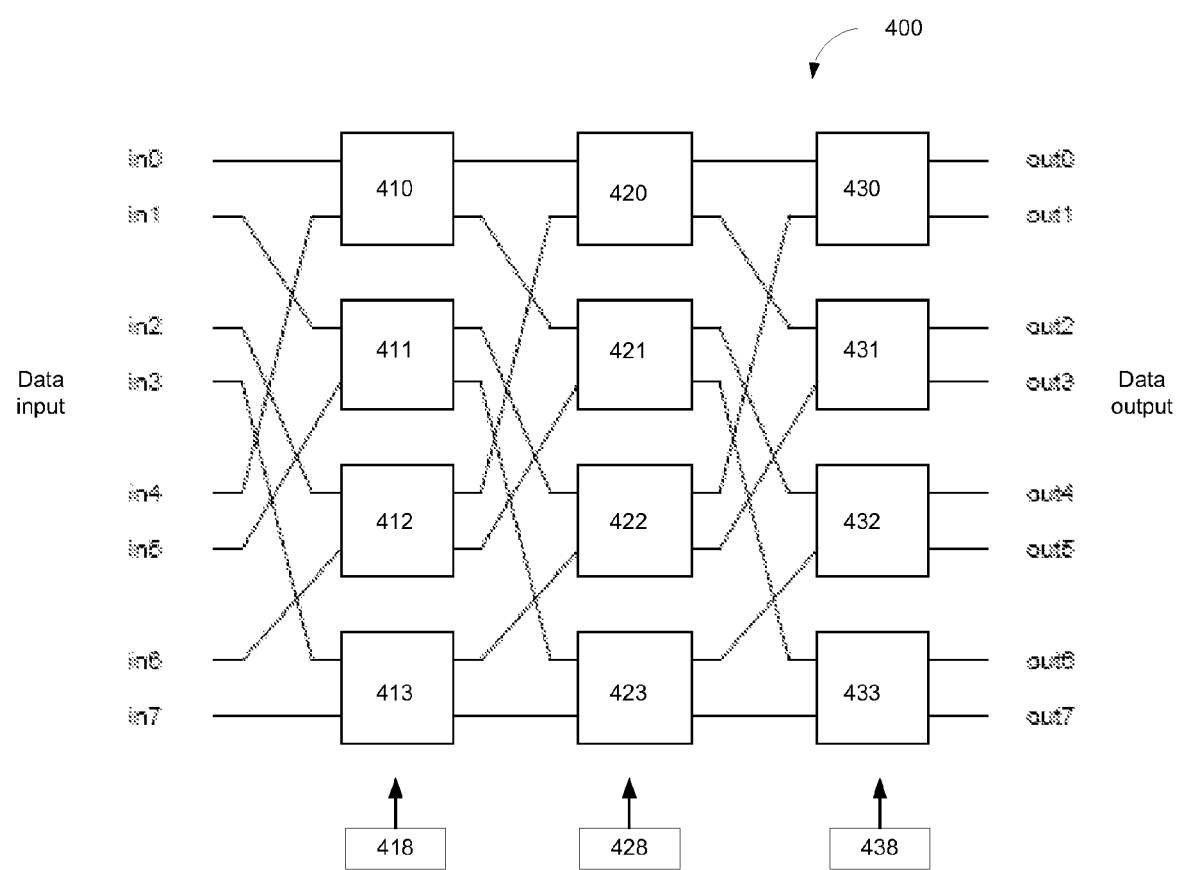
FIG. 9 is a block diagram of an exemplary embodiment of the data shuffle network that is under the control by the address scrambler.

FIG. 9 is a block diagram of an exemplary data shuffle network that is under the control by the address scrambler. In this embodiment, the data shuffle network 400 produces deceptive data, such as on a per block basis, e.g., 64 b. The implemented design may be extended to handle 128 b block if it does not violate timing. The mash values and the control signals 418, 428, and 438 to the data shuffle network 400 change on a block-to-block basis. Nevertheless, the data scrambler 400 is designed with a symmetric scheme that its inverse function guarantees proper restoration of the original data for data return path (from memory to processor on reads).

For partial-line updates, it has no impact to the performance because the byte-enable signals are shuffled in the same consistent way as the data. Writes to DRAM are controlled by the byte-enables, and hence, there is no performance impact.

The data shuffle network 400 adopts a simple effective scheme as a $2^3 \times 2^3$ network. The data shuffle network 400 includes a plurality of 2×2 switches 410-413, 420-423, and 430-433, which support exchange function. The switches 410-413 are controlled by mash values and the control signals 418. The switches 420-423 are controlled by mash values and the control signals 428. The switches 430-433 are controlled by mash values and the control signals 438. Accordingly, the data input in0-in7 are shuffled three times by the data shuffle network 400 and then re transformed to data output out0-out7. The data shuffle network 400 is further augmented with support for data mashing.

Data input in0-in7 to the data shuffle network 400 may be wired (as if bit-level permutation is hardwired in design) such that further distortion is created. For example, the byte inputs to the following network, given 64 b data, can be wired to be:

in0={d13, d24, d53, d0, d34, d22, d11, d60},
in1={d55, d14, d23, d2, d33, d12, d21, d50},
in2={d25, d28, d63, d8, d36, d32, d41, d56},
in3={d44, . . . }

Figure 10:
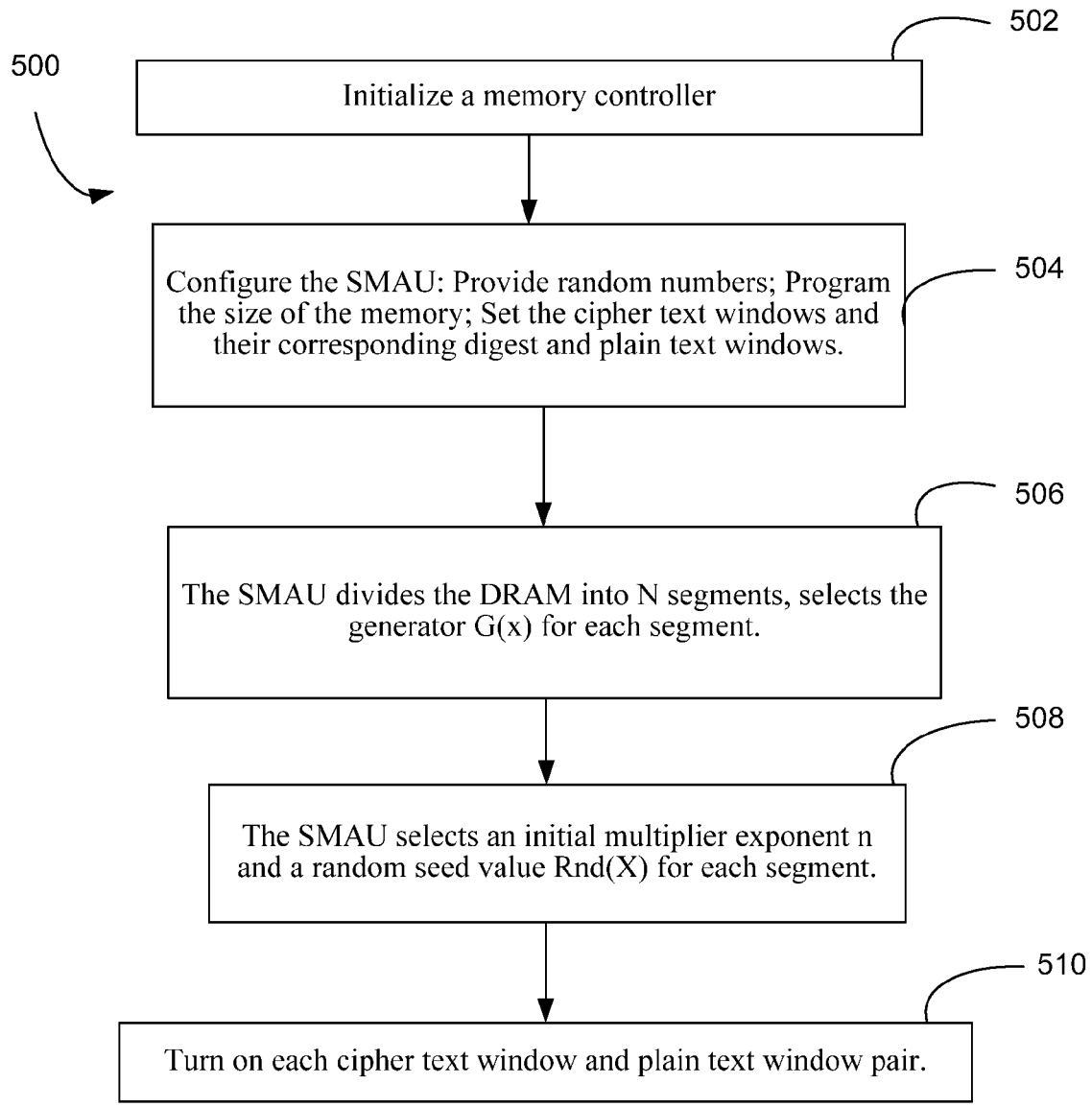
FIG. 10 is a flow chart of an exemplary configuration method at an initial power-on reset of the SMAU.

FIG. 10 is a flow chart of an exemplary configuration method 500 at an initial power-on reset of the SMAU. At power-on reset, support for secure memory region by the SMAU can be by default turned off. It can be left to vendor's secure firmware or operating system to initialize and turn on SMAU security features.

In block 502, the method initializes the memory controller coupled with external memory.

In block 504, the method configures the SMAU by the secure firmware to:
Provide a set of four 256 b true random numbers. The firmware is responsible for reading a high-entropy Random Number Generator (RNG) block to obtain the random numbers, which are then conditioned (e.g. by a cryptographic method) to generate the random numbers to be provided to SMAU.
Program the total size of the DRAM in the multiple of 16 MB.
Set the cipher text windows and their corresponding SHA256 digest and plain text windows. The cipher text windows and the SHA256 digest windows are programmed such that their address ranges are not overlapped. When the SHA256 authentication method is turned on, each 32 B data (cipher text) chunk has an additional 32 B overhead for SHA256 code, and 32 B alias plain text window in the address space.

In block 506, the SMAU divides the DRAM into N segments, where the segments can be arbitrarily set to include 16 MB, 32 MB or 64 MB, or other sizes depending on an implementation. This step may be implemented internally, i.e. opaque to the customers. After the N segments are divided, the SMAU controller selects the generator G(x) for intermixing data within 16 MB (32 MB and 64 MB) segments, respectively.

In block 508, the SMAU selects an initial multiplier exponent n and a random seed value Rnd(X) for the segments. In one embodiment, the random seed value Rnd(X) is used to calculate the block address as in equation 1. There is absolutely no restriction on the locations of the plain-/cipher-text windows, which may be readily crossing the segment boundaries (from the logic perspective of users with a linear consecutive address space), and have no impact to the SMAU logic.

Blocks 506 and 508 can create different level of randomness on bootstrap occasions.

In block 510, the method turns on cipher text windows and plain text window pairs. In one embodiment, the SMAU initializes the following when it is turned on:
The 32 B data blocks in a cipher text window by value AES (random value X) and its corresponding 32 B SHA256 digest block by SHA256 (X) if authentication are turned on. Cygnus enables an authentication method for windows independently.

Before SMAU completes its initialization, accesses to the secure window are rejected. The software checks the initialization status before using SMAU secure access feature.

In some embodiments, the above configuration method 500 is accomplished before the memory is being accessed. The vendor's secure firmware can perform the DRAM memory initialization before the control is handed off to the operation system. If data has been written into the DRAM memory before the SMAU configuration, the address scrambling logic can cause the prior written data to be inaccessible, in the sense that the address mapping from logic space to DRAM has been changed by the address scrambler.

Similarly, the SMAU may further handle accesses to other memories such as on-chip scratch RAM, and external NAND or NOR flash. The on-chip scratch RAM and NAND/NOR flash may include a plurality of secure regions in 4 KB steps, which can be accessed under secure mode only. This is enforced by the SMAU. In addition, the SMAU may integrate the Trust Zone Memory Adapter (TZMA) function for controlling accesses to on-chip RAM or NANA/NOR flash.

The methods, devices, and logic described above may be implemented in many different ways in many different combinations of hardware, software or both hardware and software. For example, all or parts of the SMAU may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the SMAU described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the SMAU may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A circuit, comprising:
    cryptographic circuitry in communication with a memory, the memory configured to store segments that include data blocks, the cryptographic circuitry configured to encrypt data of the data blocks on a block basis;
    fault injection circuitry configured to inject faults into the data blocks;
    a data scrambler configured to generate scrambled data in the memory by shuffling data bits within the data blocks with multiple rounds of shuffling; and
    an address scrambler configured to distribute the scrambled data across the segments by inter-segment permutation and further configured to select among multiple generator polynomials as a denominator of a modulo operation for distributing the scrambled data from the data blocks and segments.

2. The circuit of claim 1, wherein the address scrambler is configured to distribute the scrambled data across the segments by permutation operations that randomly map a logical memory address to a physical memory location using at least one of the multiple generator polynomials as the denominator, and using an alteration function configured to alter the logical memory address in a numerator of the modulo operation.

3. The circuit of claim 1, further comprising:
    a memory controller, a processor, and a system bus; wherein:
    the memory controller is configured to control accesses to the memory and communicate data over the system bus with the processor.

4. The circuit of claim 3, further comprising an address translation unit in communication with the memory controller, the address translation unit configured to map plain text windows to cipher text windows in the memory.

5. The circuit of claim 3, wherein the data scrambler is configured such that a symmetric inverse function is operable to restore the shuffled data bits back to an original form.

6. The circuit of claim 5, wherein:
    the memory comprises a dynamic random-access memory (DRAM); and
    the DRAM comprises a secured data area configured to store secured data that is ciphered by the cryptographic circuitry, authenticated by the memory controller, and scrambled by the data scrambler.

7. The circuit of claim 6, wherein the fault injection block is configured to flip bits of the secured data as determined by a plurality of hash functions.

8. The circuit of claim 1, wherein the address scrambler is configured to:
    calculate a mash value and a control signal; and
    control the data scrambler based on the mash value and the control signal.

9. A method comprising:
    injecting, with a processor, faults into data blocks in a memory, the memory configured to store segments that include the data blocks;
    scrambling data in the data blocks to create scrambled data by shuffling data bits within the data blocks with multiple rounds of shuffling;
    selecting among multiple generator polynomials as a denominator of a modulo operation for distributing the scrambled data from the data blocks and segments; and
    distributing, by an address scrambler of a memory access circuit, the scrambled data across the segments by inter-segment permutation, according to the generator polynomials.

10. The method of claim 9 further comprising distributing the scrambled data across the segments by permutation operations that randomly map a logical memory address to a physical memory location using at least one of the multiple generator polynomials as the denominator, and using an alteration function configured to alter the logical memory address in a numerator of the modulo operation.

11. The method of claim 10, further comprising:
    encrypting the data in the memory on a block basis;
    controlling access to data in the memory with a memory controller; and
    mapping plain text windows to cipher text windows by an address translation unit.

12. The method of claim 11 wherein the address translation unit communicates with the memory controller.

13. The method of claim 11, further comprising restoring the shuffled data bits back to an original form by a data scrambler using a symmetric inverse function.

14. The method of claim 13, further comprising ciphering, authenticating and scrambling the data in a secured data area having secured data.

15. The method of claim 14, further comprising flipping bits of the secured data, the bits determined by a hash function.

16. The method of claim 9 further comprising:
calculating, by the address scrambler, a mash value and a control signal; and
shuffling data bits based on the mash value and the control signal.

17. A system, comprising:
a memory configured store data accessible by a processor through a memory controller, the memory configured to store segments that include data blocks; and
an inline memory access circuit between the memory controller and a system bus coupled with the processor,
wherein the inline memory access circuit comprises:
cryptographic circuitry in communication with the memory that encrypts data on a block basis so that a key length for each of the data blocks is independent and random;
fault injection circuitry configured to inject faults into the memory;
a data scrambler configured to generate scrambled data by shuffling data bits within the data blocks in multiple rounds of shuffling, and mix the shuffled data with random data; and
an address scrambler configured to distribute the scrambled data across the segments of the memory by inter-segment permutation that maps a logical memory address to a physical memory location in a random manner,
wherein the inline memory access circuit is configured to select among multiple generator polynomials as a denominator of a modulo operation for distributing the scrambled data from the data blocks and segments.

18. The system of claim 17, further comprising an address translation unit in communication with the memory controller that maps plain text windows to cipher text windows in the memory.

19. The system of claim 17, wherein the data scrambler is configured such that a symmetric inverse function is operable to restore the shuffled data back to an original form; and
wherein the address scrambler is configured such that a block address and a segment address are transformed to a new block address and a new segment address using different generator polynomials of different degrees.

20. The system of claim 17, wherein:
the memory comprises a dynamic random-access memory (DRAM); and
the DRAM comprises a secured data area configured to store secured data that is ciphered by the cryptographic circuitry, authenticated by the memory controller, and scrambled by the data scrambler.

* * * * *